United States Patent
Parker et al.

(10) Patent No.: US 11,635,045 B2
(45) Date of Patent: Apr. 25, 2023

(54) INJECTOR ELEMENT FOR ROCKET ENGINE

(71) Applicant: Aerojet Rocketdyne, Inc., Sacramento, CA (US)

(72) Inventors: Douglas S. Parker, Sacramento, CA (US); Daniel P. Cap, Sacramento, CA (US); Frederick E. Dodd, Sacramento, CA (US)

(73) Assignee: AEROJET ROCKETDYNE, INC, Canoga Park, CA (US)

( * ) Notice: Subject to any disclaimer, the term of this patent is extended or adjusted under 35 U.S.C. 154(b) by 871 days.

(21) Appl. No.: 16/316,685

(22) PCT Filed: Jun. 29, 2017

(86) PCT No.: PCT/US2017/039938
§ 371 (c)(1),
(2) Date: Jan. 10, 2019

(87) PCT Pub. No.: WO2018/075102
PCT Pub. Date: Apr. 26, 2018

(65) Prior Publication Data
US 2019/0153980 A1    May 23, 2019

Related U.S. Application Data

(60) Provisional application No. 62/364,257, filed on Jul. 19, 2016.

(51) Int. Cl.
*F02K 9/52*    (2006.01)

(52) U.S. Cl.
CPC ................... *F02K 9/52* (2013.01)

(58) Field of Classification Search
CPC ........................................... F02K 9/52
See application file for complete search history.

(56) References Cited

U.S. PATENT DOCUMENTS 2,667,740 A * 2/1954 Goddard .................. F02K 9/64
60/258
3,534,909 A * 10/1970 Rosales .................. F23C 7/008
239/416

(Continued)

FOREIGN PATENT DOCUMENTS

EP    2757243    7/2014
FR    2972498    9/2012

OTHER PUBLICATIONS

International Preliminary Report on Patentability for International Application No. PCT/US2017/039938 dated Jan. 31, 2019.

(Continued)

*Primary Examiner* — Lorne E Meade

(57) ABSTRACT

An injector element for a liquid propellant rocket engine includes an oxidizer conduit, a central cavity that is fluidly coupled with the oxidizer conduit downstream of the oxidizer conduit, a first annulus that at least partially surrounds the oxidizer conduit and is fluidly coupled with an ignition fluid supply downstream of the ignition fluid supply, and a second annulus that at least partially surrounds the oxidizer conduit and is fluidly coupled with a fuel supply downstream of the fuel supply. The second annulus is fluidly coupled between the first annulus and the central cavity.

14 Claims, 1 Drawing Sheet

(56) References Cited

U.S. PATENT DOCUMENTS

| | | | | |
|---|---|---|---|---|
| 3,581,495 | A * | 6/1971 | Kah, Jr. ............... | F02K 9/52 60/742 |
| 3,702,536 | A * | 11/1972 | Gregory ............. | F02K 9/805 60/211 |
| 4,416,112 | A * | 11/1983 | Johnson ............. | F02K 9/52 60/251 |
| 4,621,492 | A * | 11/1986 | von Pragenau ...... | F02K 9/52 239/132.5 |
| 4,771,599 | A * | 9/1988 | Brown ............... | F02K 9/42 239/419.3 |
| 5,456,065 | A * | 10/1995 | Dargies ............. | F02K 9/52 239/403 |
| 5,704,551 | A * | 1/1998 | Schmidt ............. | F02K 9/52 239/403 |
| 6,185,927 | B1 * | 2/2001 | Chrones ............. | F02K 9/52 239/424 |
| 6,845,605 | B1 * | 1/2005 | Taylor ............... | F02K 9/95 60/39.824 |
| 6,918,243 | B2 * | 7/2005 | Fisher ............... | F02K 9/42 60/211 |
| 8,122,703 | B2 * | 2/2012 | Fisher ............... | F02K 9/95 60/258 |
| 10,072,612 | B2 * | 9/2018 | Bostwick ............ | B33Y 80/00 |
| 2011/0219743 | A1 | 9/2011 | Johnson | |
| 2017/0096967 | A1 * | 4/2017 | Bostwick ............ | F02K 9/566 |

OTHER PUBLICATIONS

International Search Report for International Patent Application No. PCT/US2017/039938 completed May 3, 2018.

* cited by examiner

INJECTOR ELEMENT FOR ROCKET ENGINE

CROSS-REFERENCE TO RELATED APPLICATION

The present disclosure claims priority to United States Provisional Patent Application No. 62/364,257, filed Jul. 19, 2016.

STATEMENT REGARDING FEDERALLY SPONSORED RESEARCH OR DEVELOPMENT

This invention was made with government support under Contract No. FA8811-16-9-0003 awarded by the United States Air Force. The Government has certain rights in this invention.

BACKGROUND

Liquid propellant rocket engines may be powered by a fuel propellant and an oxidizer propellant. An example of a fuel propellant is a hydrocarbon fuel such RP-1 (rocket propellant-1). An example of an oxidizer propellant is oxygen. In general, liquid propellant rocket engines use an ignition system to ignite the combustion of the RP-1 by the oxygen.

SUMMARY

An injector element for a liquid propellant rocket engine according to an example of the present disclosure includes an oxidizer conduit, a central cavity fluidly coupled with the oxidizer conduit downstream of the oxidizer conduit, and a first annulus at least partially surrounding the oxidizer conduit. The first annulus is fluidly coupled with an ignition fluid supply downstream of the ignition fluid supply, and a second annulus at least partially surrounding the oxidizer conduit. The second annulus is fluidly coupled with a fuel supply downstream of the fuel supply, and the second annulus is fluidly coupled between the first annulus and the central cavity.

In a further embodiment of any of the foregoing embodiments, the first annulus and the second annulus are coaxial with the oxidizer conduit.

In a further embodiment of any of the foregoing embodiments, the second annulus includes a plurality of inlet ports.

In a further embodiment of any of the foregoing embodiments, one or more of the inlet ports is sloped with respect to a central axis of the oxidizer conduit.

In a further embodiment of any of the foregoing embodiments, the first annulus and the second annulus are fluidly connected by a feed port.

In a further embodiment of any of the foregoing embodiments, the oxidizer conduit, the first annulus, and the second annulus are a single, monolithic piece.

An injector element for a liquid propellant rocket engine according to an example of the present disclosure includes a central cavity, a conduit that opens to the central cavity for feeding a primary fluid to the central cavity, and a first feed chamber adjacent the conduit. The first feed chamber has a first passage and a first inlet port for feeding a first fluid into the first passage. A second feed chamber is adjacent the conduit. The second feed chamber has a second passage and one or more second inlet ports for feeding a second fluid into the second passage. A feed port fluidly connects the first passage and the second passage to feed the first fluid from the first passage into the second passage. The second passage opens to the central cavity to feed the first fluid or the second fluid into the central cavity to mix with the primary fluid.

In a further embodiment of any of the foregoing embodiments, the first feed chamber and the second feed chamber are coaxial with the conduit.

In a further embodiment of any of the foregoing embodiments, the one or more second inlet ports includes a plurality of second inlet ports.

In a further embodiment of any of the foregoing embodiments, the second inlet ports are sloped with respect to a central axis of the conduit.

A further embodiment of any of the foregoing embodiments includes a first fluid source fluidly connected via the first inlet port with the first passage and a second, different fluid source fluidly connected via the one or more second inlet ports with the second passage.

In a further embodiment of any of the foregoing embodiments, the second feed chamber is axially between the first feed chamber and the central cavity.

In a further embodiment of any of the foregoing embodiments, each of the first feed chamber and the second feed chamber are annular.

A liquid propellant rocket engine according to an example of the present disclosure includes a combustion chamber that has a throat, a nozzle aft of the throat, and an injector element opening into the combustion chamber. The injector element has a central conduit, a first annulus at least partially surrounding the central conduit, a second annulus at least partially surrounding the central conduit, and a manifold in fluid communication with the first annulus. The manifold has a fluid conduit that opens to the first annulus.

In a further embodiment of any of the foregoing embodiments, the first annulus and the second annulus are coaxial with the central cavity.

In a further embodiment of any of the foregoing embodiments, the fluid conduit is an exclusive feed line into the first annulus.

In a further embodiment of any of the foregoing embodiments, the second annulus includes a plurality of inlet ports.

In a further embodiment of any of the foregoing embodiments, the first annulus and the second annulus are fluidly connected by a feed port.

In a further embodiment of any of the foregoing embodiments, one or more of the inlet ports is sloped with respect to a central axis of the central conduit.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
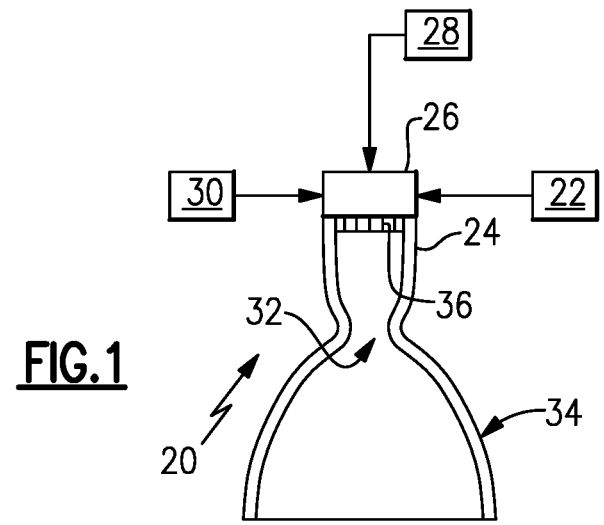
FIG. 1 illustrates an example of a liquid propellant rocket engine.

FIG. 1 schematically illustrates a liquid propellant rocket engine 20. The engine 20 is a hypergolic engine that utilizes ignition fluid (e.g., triethylaluminum-triethylborane) from an ignition fluid supply 22 to initiate combustion in a combustion chamber 24 of the engine 20. The ignition fluid is fed to an injector system 26 along with oxidizer (e.g., liquid oxygen) from an oxidizer supply 28. Once combustion is initiated, fuel from a fuel supply 30 is fed to the injector system 26 to burn with the oxidizer. The combustion gases are accelerated through a throat 32 and then discharged through a nozzle 34 to generate thrust.

Figure 2:
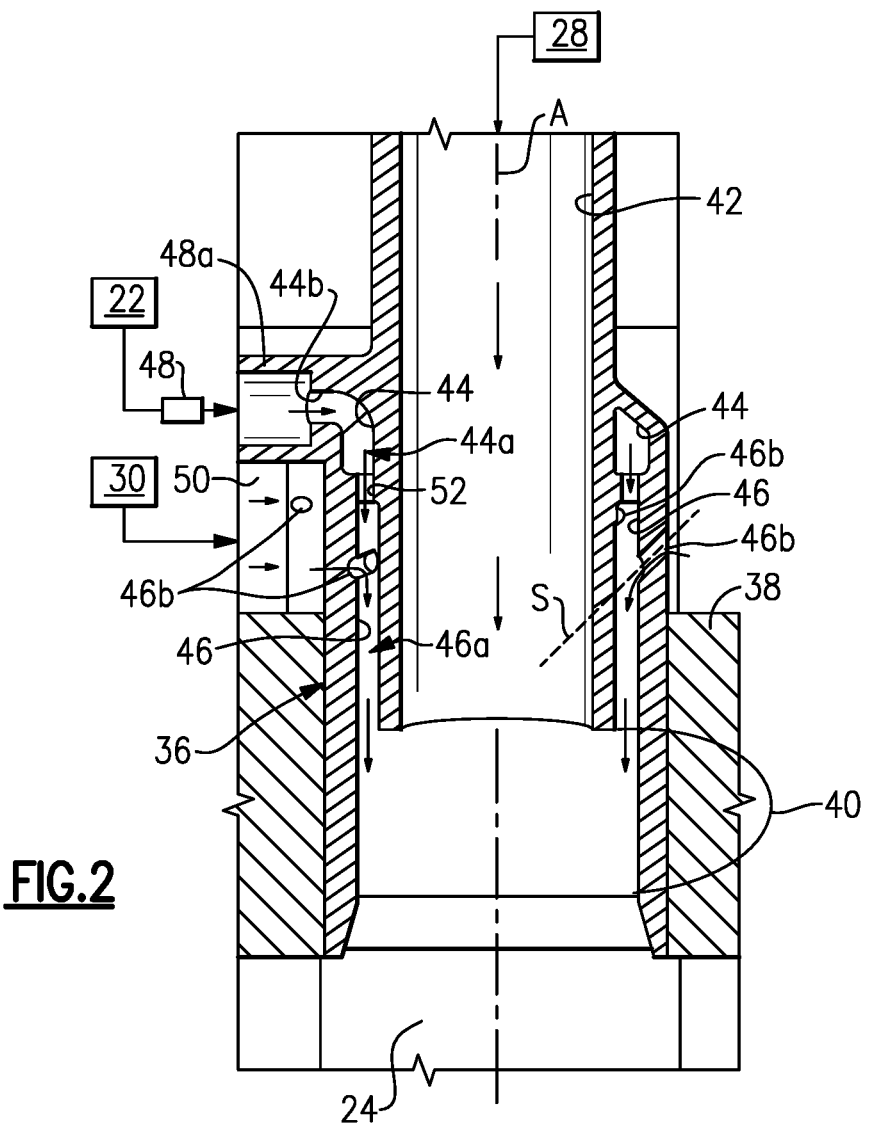
FIG. 2 illustrates an example injector element of the rocket engine.

The injector system 26 includes one or more injector elements 36. A representative one of the injector elements 36 is shown in cross-section in FIG. 2. As will be described, the injector element 36 is configured to inject three different propellant fluids, which here are oxidizer, ignition fluid, and fuel. As will be appreciated, although shown in the rocket engine 20, the injector element 36 may also benefit other types of engines.

As shown, the injector element 36 is mounted with a face plate 38 that is adjacent the combustion chamber 24. The injector element 36 includes injection central cavity 40 that opens into the combustion chamber 24. A central conduit 42, which here is an oxidizer conduit that is fluidly connected to the oxidant source 28, opens to the central cavity 40 for feeding a primary fluid (oxidizer) to the central cavity 40. The central conduit 42 defines a central axis A. In this example, the central conduit 42 is an elongated tube.

There are first and second feed chambers 44/46 adjacent the central conduit 42. The second feed chamber 46 is axially between the first feed chamber 44 and the central cavity 40. In this example, the feed chambers 44/46 are annular such that the first feed chamber 44 is a first annulus and the second feed chamber is a second annulus. For instance, the annuli fully circumscribe or surround the central conduit 42. In alternative examples, the feed chambers 44/46 may only partially surround the central conduit 42.

The first feed chamber 44 includes a first passage 44a and a first inlet port 44b for feeding a first fluid, such as the ignition fluid, into the first passage 44a. In this example, the inlet port 44b is connected with a fluid conduit 48a of a manifold 48. As an example, the fluid conduit 48a is an exclusive feed line into the first feed chamber 44. Although not shown, the manifold 48 may have multiple fluid conduits for feeding the ignition fluid to a plurality of the injector elements 36.

The second feed chamber 46 includes a second passage 46a and one or more second inlet ports 46b for feeding a second fluid, such as the fuel, into the second passage 46a. Unlike the first inlet port 44b, the second inlet ports 46b do not directly connect to a feed line. Rather, the second inlet ports 46b open to a plenum 50 that surrounds the injector element 36. The plenum 50 may feed fuel to multiple injector elements 36.

The first and second passages 44a/46a are fluidly connected via a feed port 52. The fluid fed to the first passage 44a is thus fed through the feed port 52 into the second passage 46a. The second passage 46a opens to the central cavity 40 to feed the first fluid or the second fluid into the injection cavity 40 to mix with the primary fluid from the central cavity 42.

In operation the injector element 36 functions to introduce the three propellants—oxidizer, ignition fluid, and fuel. Initially, to start the engine 20, oxidizer is provided from the oxidizer supply 28 through the central conduit 42. The ignition fluid is provided from ignition fluid supply 22 through the manifold 48 and fluid conduit 48a into the first passage 44a in the first feed chamber 44. The ignition fluid then flows through the feed port 52 into the second passage 46a in the second feed chamber 46. The ignition fluid is discharged from the second passage 46a into the central cavity 40. In the central cavity 40 the ignition fluid mixes with oxidizer from the central conduit 42 for spontaneous combustion in the combustion chamber 24 to start the engine 20.

After initiation of combustion, the flow of ignition fluid is ceased and the fuel from the fuel supply 30 is provided through the plenum 50 to the injector element 36. The fuel flows through the second inlet ports 46b into the second passage 46a. In this example, the second inlet ports 46b are sloped with respect to the central axis A, as represented by port central axis line "S." In one example, the central axis line S is also non-intersecting with the central axis A to generate a swirling flow of the fuel as it enters the second passage 46b, for enhanced mixing. The fuel is then discharged from the second passage 46b into the central cavity 40 in which the fuel mixes with the oxidizer from the central conduit 42 for combustion in the combustion chamber 24.

The injector element 36 may be fabricated using an additive manufacturing process. Additive manufacturing involves the building of a component, such as the injector element 36, layer-by-layer according to a computer model (e.g., a computer-aided-design file). Example additive manufacturing process include, but are not limited to, selective laser melting and electron beam welding. The injector element 36, if made by additive manufacturing, would be a single, monolithic piece that is free of mechanical joints welded joints between sub-components. For instance, the central conduit 42, the first feed chamber (annulus) 44, the second feed chamber (annulus) 46, and the fluid conduit 48a may be produced by additive manufacturing such that the central conduit 42, the first feed chamber (annulus) 44, the second feed chamber (annulus) 46, and the fluid conduit 48a are a single, monolithic piece.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An injector element for a liquid propellant rocket engine, comprising:
   a central cavity;
   a conduit that opens to the central cavity for feeding a primary fluid to the central cavity;
   a first feed chamber adjacent the conduit, the first feed chamber including a first passage and a first inlet port for feeding a first fluid into the first passage;
   a second feed chamber adjacent the conduit, the second feed chamber including a second passage and one or more second inlet ports for feeding a second fluid into the second passage; and
   a feed port fluidly connecting the first passage and the second passage to feed the first fluid from the first passage into the second passage, wherein the second passage opens to the central cavity to feed the first fluid or the second fluid into the central cavity to mix with the primary fluid.

2. The injector element as recited in claim 1, wherein the first feed chamber and the second feed chamber are coaxial with the conduit.

3. The injector element as recited in claim 1, wherein the one or more second inlet ports includes a plurality of second inlet ports.

4. The injector element as recited in claim 3, wherein the second inlet ports are sloped with respect to a central axis of the conduit.

5. The injector element as recited in claim 1, further comprising a first fluid source fluidly connected via the first inlet port with the first passage and a second, different fluid source fluidly connected via the one or more second inlet ports with the second passage.

6. The injector element as recited in claim 1, wherein the second feed chamber is axially between the first feed chamber and the central cavity.

7. The injector element as recited in claim 1, wherein each of the first feed chamber and the second feed chamber are annular.

8. A liquid propellant rocket engine, comprising:
a combustion chamber including a throat;
a nozzle aft of the throat; and
an injector element opening into the combustion chamber, the injector element including, an oxidizer conduit;
a central cavity fluidly coupled with the oxidizer conduit downstream of the oxidizer conduit;
a first annulus at least partially surrounding the oxidizer conduit, wherein the first annulus is fluidly coupled with an ignition fluid supply downstream of the ignition fluid supply, the ignition fluid supply including triethylaluminum-triethylborane;
a second annulus at least partially surrounding the oxidizer conduit, wherein the second annulus is fluidly coupled with a fuel supply downstream of the fuel supply; and
wherein the central cavity is fluidly connected to the first annulus via the second annulus.

9. The liquid propellant rocket engine as recited in claim 8, wherein the first annulus and the second annulus are coaxial with the central conduit.

10. The liquid propellant rocket engine as recited in claim 9, wherein the fluid conduit is an exclusive feed line into the first annulus.

11. The liquid propellant rocket engine as recited in claim 10, wherein the second annulus includes a plurality of inlet ports.

12. The liquid propellant rocket engine as recited in claim 11, wherein the first annulus and the second annulus are fluidly connected by a feed port.

13. The liquid propellant rocket engine as recited in claim 12, wherein one or more of the inlet ports is sloped with respect to a central axis of the central conduit.

14. The liquid propellant rocket engine as recited in claim 8, wherein the injector element includes a central cavity into which the central conduit opens, and the central cavity is fluidly connected to the first annulus via the second annulus.

\* \* \* \* \*